United States Patent [19]

Graham

[11] Patent Number: 5,345,479

[45] Date of Patent: Sep. 6, 1994

[54] SENSITIVITY ENHANCEMENT FOR AIRBORNE RADIOACTIVITY MONITORING SYSTEM TO DETECT REACTOR COOLANT LEAKS

[75] Inventor: Kingsley F. Graham, Murrysville, Pa.

[73] Assignee: Westinghouse Electric Corporation, Pittsburgh, Pa.

[21] Appl. No.: 32,579

[22] Filed: Mar. 17, 1993

[51] Int. Cl.[5] ............................................. G21C 17/00
[52] U.S. Cl. ..................................... 376/250; 376/253
[58] Field of Search ............... 376/250, 251, 253, 256; 976/DIG. 209, DIG. 215, DIG. 227; 250/343

[56] References Cited

U.S. PATENT DOCUMENTS

| | | | |
|---|---|---|---|
| 3,621,238 | 11/1971 | Jalbert et al. | 250/83.6 FT |
| 3,644,172 | 2/1972 | Campbell | 376/250 |
| 3,712,850 | 1/1973 | Campbell et al. | 176/19 |
| 3,721,970 | 3/1973 | Niemoth | 340/242 |
| 3,791,107 | 2/1974 | Gustavsson | 55/179 |
| 3,801,441 | 4/1974 | Jones | 376/253 |
| 3,849,655 | 11/1974 | Martucci | 250/366 |
| 3,888,973 | 6/1975 | Colwell et al. | 423/493 |
| 3,890,100 | 6/1975 | Busch | 23/232 E |
| 3,961,920 | 6/1976 | Gilbert | 55/387 |
| 4,092,539 | 5/1978 | Pao et al. | 250/336 |
| 4,262,203 | 4/1981 | Overhoff | 250/374 |
| 4,426,581 | 1/1984 | Kreiner et al. | 250/380 |
| 4,647,425 | 3/1987 | Battaglia et al. | 376/308 |
| 4,659,477 | 4/1987 | Macedo et al. | 210/679 |
| 4,663,113 | 5/1987 | Jester et al. | 376/256 |
| 4,680,470 | 7/1987 | Heald | 250/358.1 |
| 4,820,925 | 4/1989 | Balmer et al. | 250/379 |
| 4,992,232 | 2/1991 | Cowan, II et al. | 376/306 |

OTHER PUBLICATIONS

Monitoring Reactor Coolant System Leaks in The Reactor Vessel Head Region with an Airborne Particulate Radioactivity Monitor at Turkey Point Units 3 and 4, by Frank J. Varona, et al.: American Nuclear Society Reactor Operations Division; Topical Meeting on Reactor Operating Experience Charlotte, N.C. on Aug. 6–9, 1989.

Primary Examiner—Donald P. Walsh
Assistant Examiner—Meena Chelliah
Attorney, Agent, or Firm—G. R. Jarosik

[57] ABSTRACT

A method and apparatus for measuring radioactivity associated with nuclear reactor coolant leaks. The method includes providing a delay tank in a gas sampling line upstream of a radiation particulate monitor, the delay tank allowing radioactive noble gases from the leak to decay to radioactive daughter particulates that are monitored by the radiation particulate monitor. The apparatus includes the delay tank as well as a background delay tank and a valve sequencer for comparing radiation associated with the delay tank to radiation associated with the background delay tank.

14 Claims, 3 Drawing Sheets

SENSITIVITY ENHANCEMENT FOR AIRBORNE RADIOACTIVITY MONITORING SYSTEM TO DETECT REACTOR COOLANT LEAKS

BACKGROUND OF THE INVENTION

1. Field of the Invention

The present invention relates to systems used to detect nuclear reactor coolant leaks. In particular, the invention relates to the use of sensitivity enhancement devices for allowing airborne particulate monitors to more readily sense reactor coolant leaks.

2. Brief Description of the Prior Art

An airborne particulate radioactivity monitor can be used to detect nuclear reactor coolant leaks by measuring the airborne particulate activity produced by the leak. A problem with these prior art detectors, however, is the hard-to-quantify losses of radioactive particulates, occurring both at the leak location and as a result of plate-out losses in the sample line between the leak location and the monitoring location.

Gaseous radionuclides have nearly a 100% release to the air from nuclear reactor coolant leaks and have minimal plate-out losses in the sample line. Gas airborne radioactivity monitors have much lower sensitivity than particulate airborne radioactivity monitors, however, because the gas monitor only responds to the quantity of gas in the sample chamber viewed by the detector. The particulate monitor, on the other hand, responds to the radioactive particulates that have been collected over an extended period of time on a filter. The ratio of sensitivities for particulate to gaseous monitors is on the order of 10,000.

In summary, both the particulate monitor and the gas monitor have serious drawbacks when used for nuclear reactor coolant leak detection. The particulate monitor has hard-to-quantify loss of particulate activity, both at the leak location and losses resulting from plate-out on the sample line walls. The gas monitor has extremely low sensitivity compared to the particulate monitor.

U.S. Pat. No. 4,820,925, discloses a room air monitor for radioactive aerosols that uses a filter system to collect suspended particles that are carried through the system through the airflow into the monitor, and these particles are detected and examined for radioactivity by the detector-preamplifier combination of the device. This device could not, by itself, be used to examine the radioactivity due to gaseous radionuclides escaping from a nuclear power plant.

U.S. Pat. No. 3,712,850, discloses a method for determining reactor coolant system leakage that uses a gas detector to measure the radioactivity produced by short half-lived noble gas isotopes. This invention suffers from the previously noted insensitivity of gaseous monitors.

U.S. Pat. No. 4,092,539, discloses a system for indicating radiation from a radioactive fluid such as a gas, wherein simultaneous indications of the activity concentration of radioactivity of the gas, the radiation dose rate, and average energy of the radiation are provided.

U.S. Pat. No. 4,262,203, discloses an alpha particle monitor which includes a flow-through linear ionization chamber with means to pass therethrough gas-borne radioactive matter exhibiting alpha decay, such as radon gas, airborne plutonium or uranium dust.

U.S. Pat. No. 4,426,581, discloses an arrangement for measuring radioactivity concentrations. The apparatus measures noble gas activity concentration and aerosol activity concentration and compresses the gas whose activity concentration is to be measured in order to reduce the volume of the measuring chamber and the weight of the shielding housing.

U.S. Pat. No. 3,621,238, discloses a gamma insensitive air monitor for radioactive gases. This disclosure utilizes an ionization chamber instrument for measuring the concentration of the radioactive gases in the air. External gamma radiation effects on the instrument are eliminated through the use of a compensating chamber mounted next to the measuring chamber, with both chambers orbiting about a common axis.

U.S. Pat. No. 3,849,655, discloses a light water reactor primary coolant leakage monitor. The monitor relies on the radioactive decay of nitrogen-13 and fluorine-18 found in irradiated water, by the emission of positrons.

Despite the above-described devices and methods, there remains a need in the art for a reliable method of measuring airborne radioactivity resulting from nuclear reactor coolant leaks.

SUMMARY OF THE INVENTION

It is an object of the invention to provide a method of measuring radiation associated with the decay of radioactive noble gases to radionuclide particulate daughters.

It is a further object of the invention to perform this measurement using radiation particulate monitors.

It is still another object of the invention to compare any radiation being measured to background radiation.

It is still another object of the invention to provide a means of allowing the radioactive noble gases sufficient time to decay to radionuclide daughter elements for the particulate monitor to be effectively used.

According to one embodiment of the present invention, a method of detecting nuclear reactor radioactive gas leaks is provided which includes the steps of providing a sample line for sampling radioactive gases leaking from a nuclear reactor, providing a delay tank in the sample line downstream from the nuclear reactor, the delay tank being sized to retain the radioactive gases for a sufficient residence time to enable the radioactive gases to decay to radionuclide particulates that comprise alkaline element daughters of the radioactive noble gases. The method further includes providing an airborne radioactive particulate monitor in the sample line downstream from the delay tank, and measuring the activity associated with the radionuclide particulates with the radioactive particulate monitor.

Another embodiment of the invention comprises a nuclear reactor gas leak monitoring system having a sampling line for transporting radioactive gases leaking from the reactor, and further including a delay tank in the sampling line downstream from the reactor for holding the radioactive gases for a residence time sufficient to enable the radioactive gases to decay to airborne radionuclide particulates susceptible to activity measurement. The apparatus further includes an in-line airborne radioactive particulate monitor downstream from the delay tank.

These and other objects of the invention will become more readily apparent as the following detailed description of the preferred embodiments proceeds.

BRIEF DESCRIPTION OF THE DRAWINGS

The accompanying drawings, which are incorporated in and form part of the specification, illustrate an embodiment of the present invention, and together with the description, serve to explain the principals of the invention.

DETAILED DESCRIPTION OF THE INVENTION

Figure 1:
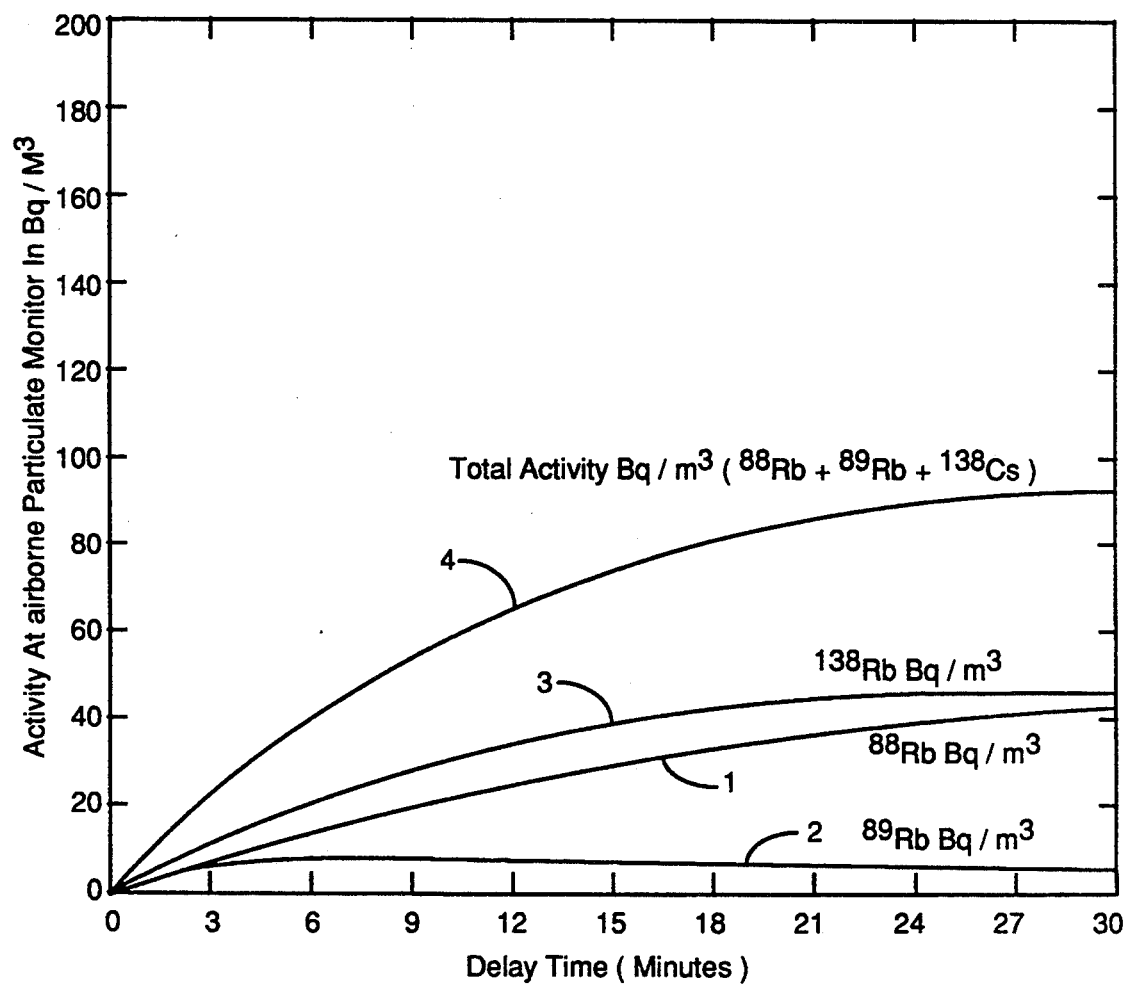
FIG. 1 is a graphical representation of activity at an airborne particulate monitor versus delay time assuming 100% particulate losses at the point of escape of radioactive gases from a nuclear reactor.

In an operating nuclear reactor, the radioactive noble gas fission products such as $^{88}$Kr, $^{89}$Kr and $^{138}$Xe readily escape fuel defects and form a significant fraction of the reactor coolant activity. In a coolant leak from the reactor, such as from the control rod drive canopy seal and the control rod drive reactor head penetration region and the incore instrumentation at the bottom of the reactor vessel, these gaseous activities are released into the air in the region of the leak with nearly 100% release (0% losses). These noble gases decay into alkaline radionuclides such as $^{88}$Rb, $^{89}$Rb and $^{138}$Cs. The processes are:

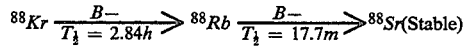

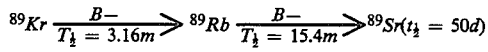

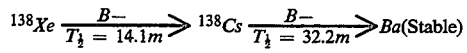

There are other gaseous radionuclides that decay into alkaline elements. Typically, however, they either have too long a half life or the daughter nuclide is stable.

In the reactor coolant, during steady state, the activity levels of the daughter alkaline radionuclides are typically the same as the parent noble gas radionuclides in Becquerels (Bq) per unit volume (disintegrations per second per unit volume) because the half lives of the above radionuclides are short compared with their removal time by the demineralizer or through escape into the gas region of the volume control tank. There is little direct release of short half life alkaline radionuclides from fuel leaks.

At a coolant leak, both the noble gas and alkaline radionuclides are released into the region of the leak. Nearly 100% of the radioactive noble gases are released into the air surrounding the leak. A potentially hard-to-quantify fraction of the alkaline radionuclides form transportable airborne particulates, while the rest deposit near the leak location. A sample line that draws a sample of the air in the region of the leak will transfer essentially 100% of the noble gases to the monitor, while a significant and hard-to-quantify fraction of the alkaline radionuclides in the particulates are lost on the walls of the sample line and do not reach the monitor.

As previously stated, a gas monitor has much lower sensitivity than a particulate monitor and the particulates have significant and hard-to-quantify losses.

According to the present invention, a delay tank 10 is placed at the end of a sample line 12 just prior to an airborne radioactive particulate monitor 14. See FIG. 3. In the delay tank 10, the noble gas radionuclides, which have suffered little loss exiting the leak, are allowed to decay into alkaline radionuclides that, being initially charged ions, will readily adhere to any particulates that are always in the air. These alkaline radionuclides on particulates can then be measured with high sensitivity. The amount of each radionuclide can be calculated and the optimum delay time calculated.

The equations for $^{88}$Kr decaying into $^{88}$Rb are:

$$\frac{dN_{88Kr}}{dt} = -\lambda_{88Kr} N_{88Kr}$$

$$\frac{dN_{88Rb}}{dt} = \lambda_{88Kr} N_{88Kr} - \lambda_{88Rb} N_{88Rb}$$

Where:

$\frac{dN_{88Kr}}{dt}$ = rate of change of the concentration of $^{88}$Kr $N_{88}$ = concentration of up $^{88}$Kr
$\lambda_{88Kr}$ = decay constant for $^{88}$Kr = ln ((2)/half life of $^{88}$Kr $\frac{dN_{88Rb}}{dt}$ = rate of change of the concentration of $^{88}$Rb $N_{88Rb}$ = concentration of $^{88}$Rb
$\lambda_{88Rb}$ = decay constant for $^{88}$Rb = ln (2)/half life of $^{88}$Rb Identical equations with different coefficients apply for $^{88}$Kr decaying into $^{89}$Rb and for $^{138}$Xe decaying into $^{138}$Cs.

The decay rate for $^{88}$Rb is the decay constant times the concentration of $^{88}$Rb:

$$\frac{\text{Becquerels}}{\text{Unit Volume}} = \frac{\text{Disintegration/sec}}{\text{Unit Volume}} =$$

$$\lambda_{88Rb}(\text{sec}^{-1}) * N_{88Rb} \frac{\text{Atoms}}{\text{Unit Volume}}$$

These equations can be solved if the initial concentration at zero time for each radionuclide is known.

In the reactor coolant at steady state, the activity Bq/unit volume of the parent noble gas $^{88}$Kr and the daughter $^{88}$Rb are essentially equal. At the leak location and in the sample line, a significant fraction of the $^{88}$Rb is lost prior to entering the delay tank or particulate monitor if this invention is not used.

An example is given to show the benefit of the delay tank. In this example, the concentration of noble gases in the air surrounding the leak from the coolant leak are:

| | |
|---|---|
| $^{88}$Kr | 66 Bq/m$^3$ |
| $^{89}$Kr | 66 Bq/m$^3$ |
| $^{138}$Xe | 198 Bq/m$^3$ |
| Total | 330 Bq/m$^3$ |

If none of the particulate radionuclide reach the monitor location due to losses at the leak and in the sample line, the particulate activity at the particulate monitor without the present invention is zero.

FIG. 1 shows the concentration of particulate activity after the delay tank if the present invention is used. The plot shows activity in Bq/m$^3$ as a function of delay time. The curve labeled 4 is the Total Bq/m$^3$ from $^{88}$Rb, $^{89}$Rb and $^{138}$Cs. Curve 1 is for $^{88}$Rb, curve 2 is for $^{89}$Rb and curve 3 is for $^{138}$Cs. The total particulate activity builds up from the initial zero to above 90 Bq/m$^3$ in 30 minutes. This is a significant fraction of the initial gaseous activity even though all particulates initially in equilibrium with the escaped gas are assumed lost, either in the leak and/or in the sample line prior to the delay tank 10. Thus, FIG. 1 represents a worst case scenario.

A more optimistic case is where 50% of the reactor coolant alkaline radionuclides form transportable particulates (50% are lost near the leak) and 50% of these get to the monitor end of the sample line (another 50% loss). If the alkaline radionuclides are in equilibrium with their noble gas parents in the coolant inside the reactor, the concentration of particulates at the monitor with no delay is:

$$330\ Bq/m^3 * .5 * .5 = 82.5\ \frac{Bq}{m^3}$$

This is less than the previous example where a near optimum delay tank is used and 100% of the initial particulates are lost.

Figure 2:
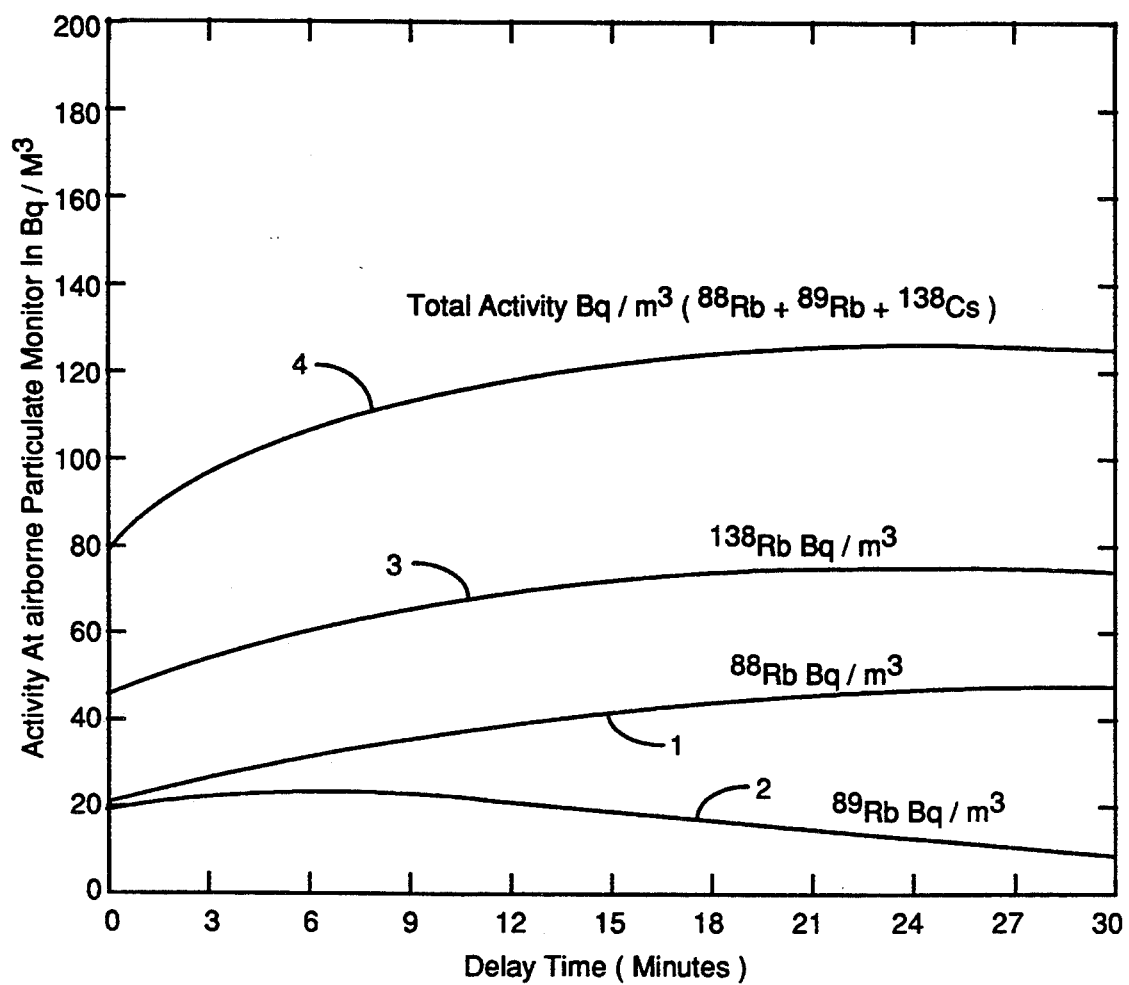
FIG. 2 is a graphical illustration of activity at an airborne particulate monitor versus delay time assuming 75% particulate losses, or 25% transmission of radioactive particulates from the leak point to the monitoring device.

FIG. 2 shows the particulate concentration at the monitor if the 50% times 50% loss example is used with a delay tank. In this case at about 20 minutes delay, the concentration of the total particulates peaks at about 130 Bq/m$^3$, which is a significant gain.

The major advantage of this invention is that it does not rely on the escape of non-gaseous alkaline radionuclides at a leak to form transportable particulates and then rely on the transport of these particulates to the monitor without significant loss. FIG. 1 shows that a higher level of particulates is obtainable with a delay tank and 100% particulate loss prior to the delay tank than can be obtained with reasonable but hard-to-prove losses of particulates and no delay tank. If a delay tank is used, the concentration of particulates increases in the example in FIG. 2.

Significant gains can be gained with shorter delay times. In FIG. 1, a 6 minute delay gives more than 40 Bq/m$^3$ if particulate losses are 100%.

Figure 3:
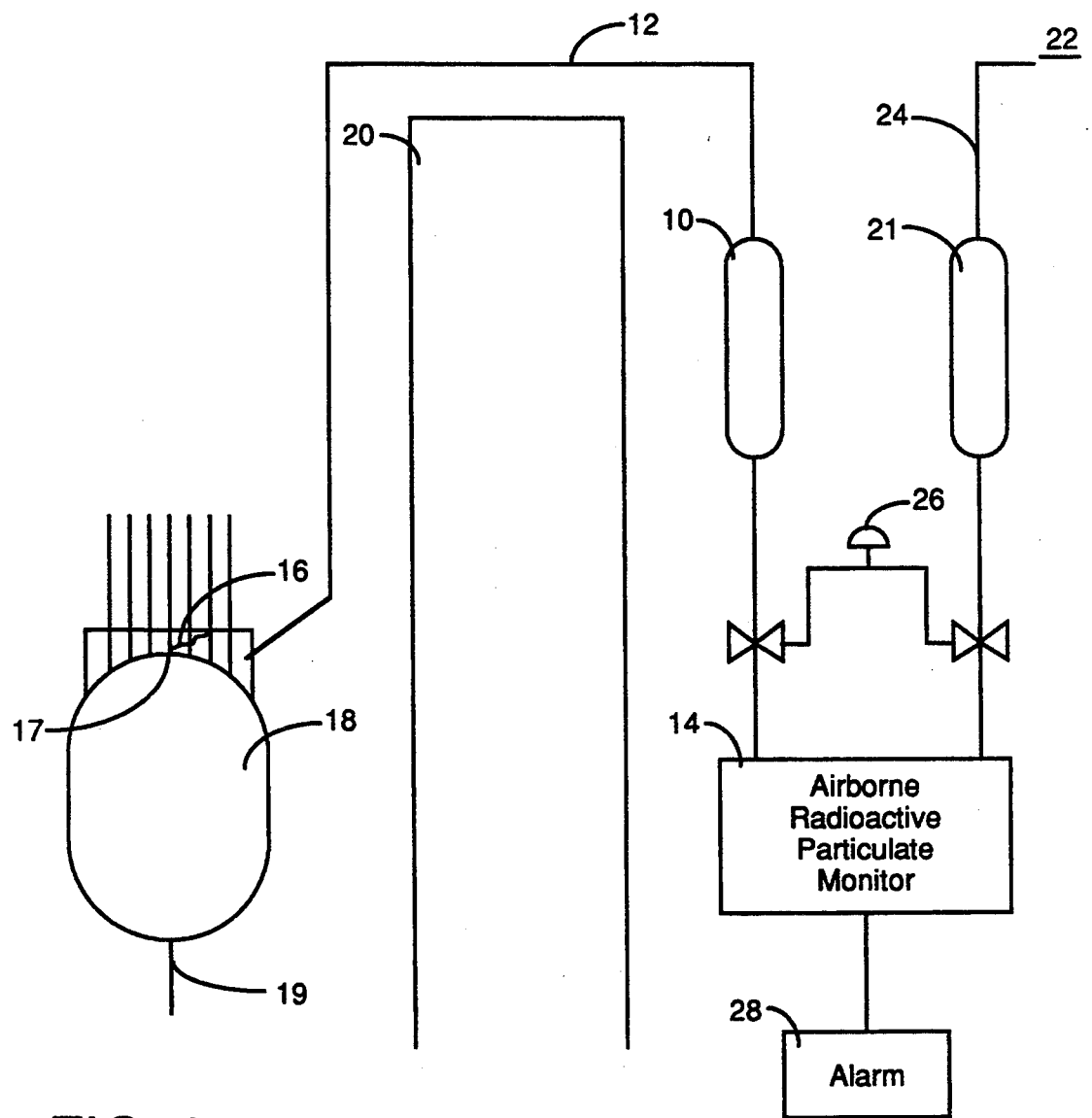
FIG. 3 is a schematic representation of a nuclear reactor including a sample line, delay tank, and background sampling tank as well as an airborne radioactive particulate monitor in accordance with a preferred embodiment of the present invention.

FIG. 3 shows the application of the invention to monitor for reactor coolant leaks. A delay tank 10 is added to the sample line 12 downstream of the nuclear reactor 18, outside the refueling cavity wall and shielding 20 and just prior to the particulate monitor 14.

In operation, a gaseous leak 16 from a nuclear reactor 18, for example from the control rod drive penetrations 17 at incore instrumentation penetrations 19, results in radioactive noble gases such as $^{88}$Kr, $^{89}$Kr and $^{138}$Xe being transmitted through the sample line 12 and into the delay tank 10. The delay tank is sized to retain the radioactive gases for a sufficient residence time to enable the radioactive gases to decay to radionuclide particulates, such as alkaline element daughters $^{88}$Rb, $^{89}$Rb, and $^{138}$Cs. At the time of the gaseous release, these noble gases are in equilibrium with their alkaline daughters, but nearly 100% of the gas is released into the sample line and to the delay tank, whereas much of the alkaline daughters, being in particulate form, are lost at the leak due to two phenomena; many of the dust particles comprising these elements fall out at the point of the leak and never make it through the sample line to the particulate monitor, while other radioactive daughter particulates plate-out on the walls of the sample line 12, also never making it to the particulate monitor, as previously described.

The size of the delay tank 10 will depend on the particular circumstances of each application, however, a tank sized for about 30 minute retention is, as a practical matter, about the maximum size for the tank 10 in view of the cost of producing a tank of this size as well as the amount of space a tank of this size would require. For more practical applications, a tank having a 3 to 9 minute residence time would be more preferred. As illustrated in FIG. 3, the tank 10 should have a vertical orientation so that the amount of radioactive particulates that settle out can be minimized. As also illustrated in FIG. 3, the delay tank 10 should be positioned above the measuring apparatus 14 to more readily allow the particulates to be transferred to and monitored by the particulate monitor 14. Additionally, the delay tank 10 should be designed to maintain laminar flow and minimize turbulence at the inlet to the tank 10, and should be of sufficient size to minimize plate-out losses on the internal surfaces of the tank 10.

As also illustrated in FIG. 3, a preferred embodiment of the invention includes a background sample tank 21 for receiving a background sample 22 through a background sample line 24. This background sample tank 21 interfaces with the delay tank 10 through a valve sequencer 26 which is designed to allow the monitor 14 to indicate when the radioactivity due to the radiation coming from the delay tank 10 significantly exceeds that radioactivity as measured from the background sample tank 21. The activity levels need to be sufficiently high in the delay tank such that they can be measured with 4 sigma statistics. Generally, an increase of radiation associated with the delay tank 10 of about 10% relative to background radiation will be sufficient to indicate that an upset condition is occurring and that appropriate corrective measures should be taken. This can be accomplished through the use of a suitable alarm 28 which comprises no part of this invention and is well known to those skilled in the art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended claims and any and all equivalents thereof.

What is claimed is:

1. A method of detecting nuclear reactor radioactive gas leaks, including the steps of:
   a. providing a sample line for sampling radioactive gases leaking from a nuclear reactor;
   b. providing a first delay tank in said sample line downstream from said nuclear reactor, said first delay tank sized to retain said radioactive gases for a sufficient residence time to enable said radioactive gases to decay to radionuclide particulates;

c. providing an airborne radioactive particulate monitoring means in said sample line downstream from said first delay tank;

d. measuring the activity associated with said radionuclide particulates with said airborne radioactive particulate monitoring means.

2. The method of claim 1, further including the step of:

e. comparing the activity measured in step (d) with an acceptable activity, and if the measured activity substantially exceeds the acceptable activity, triggering an alarm means.

3. The method of claim 2, wherein said comparing is achieved by using a background radiation sampling line having a background radiation delay tank therein, upstream from a said particulate monitor, said background radiation delay tank being of substantially the same size as said first delay tank, and wherein said acceptable activity comprises the activity associated with said background delay tank as monitored by said particulate monitoring means.

4. The method of claim 1, wherein said radioactive gases include at least one of $^{88}Kr$, $^{89}Kr$, and $^{138}Xe$.

5. The method of claim 4, wherein said radionuclide particulates include at least one of $^{88}Rb$, $^{89}Rb$, and $^{138}Cs$.

6. The method of claim 1, wherein said first delay tank is sized to maintain laminar flow through said first delay tank at gas flow rates of about 1–5 cfm.

7. The method of claim 1, wherein said residence time is selected to coincide with peak total radionuclide particulate concentration being measured by said airborne radioactive particulate monitoring means.

8. In a nuclear reactor radioactivity monitoring system having a sampling line for sampling radioactive gases leaking from a reactor, the improvement comprising a first delay tank in said sampling line downstream from said reactor for holding said radioactive gases for a residence time sufficient to enable said radioactive gases to decay to airborne radionuclide particulates susceptible to activity measurement, and further including an in-line airborne radioactive particulate monitor downstream from said first delay tank.

9. The nuclear reactor radioactivity monitoring system of claim 8, wherein said sampling line samples gases near at least one of control rod drive penetrations and incore instrumentation penetrations of a nuclear reactor.

10. The nuclear reactor radioactivity monitoring system of claim 9, wherein said first delay tank is sized to provide a radioactive gas residence time coinciding with a peak total radionuclide particulate concentration as measured by said airborne radioactive particulate monitor.

11. The nuclear reactor radioactivity monitoring system of claim 9, wherein said first delay tank has a vertical orientation.

12. The nuclear reactor radioactivity monitoring system of claim 8, further including a background sampling line receiving air from a background source external to the nuclear reactor containment vessel, said sampling line having a background delay tank downstream from said background source, said background delay tank being of substantially the same size as said first delay tank, said background delay tank being upstream of and connected to said particulate monitoring means, and said particulate monitoring means being adapted to compare radiation associated with said background delay tank to radiation associated with said first delay tank.

13. The nuclear reactor radioactivity monitoring system of claim 12, wherein said first delay tank and said second delay tank are connected at their outlets by a valve sequencer means for allowing said particulate monitoring means to sample and compare radiation associated with said first delay tank and said background delay tank.

14. The nuclear reactor radioactivity monitoring system of claim 13, further including an alarm means for alerting of an upset condition wherein the radioactivity associated with said first delay tank substantially exceeds the radioactivity associated with said background delay tank.

* * * * *